United States Patent [19]
Hashimoto et al.

[11] Patent Number: 5,802,271
[45] Date of Patent: Sep. 1, 1998

[54] TERMINAL DEVICE MANAGEMENT SYSTEM AND A METHOD FOR DETECTING A FAILED TERMINAL DEVICE USING THE SYSTEM

[75] Inventors: Yasuhiro Hashimoto; Masahiro Sako; Hiroyuki Inenaka; Yuji Yamashita, all of Osaka, Japan

[73] Assignee: Mita Industrial Co., Ltd., Osaka, Japan

[21] Appl. No.: 137,590

[22] Filed: Oct. 15, 1993

[30] Foreign Application Priority Data

Oct. 20, 1992 [JP] Japan ................... 4-282049

[51] Int. Cl.⁶ ........................... G06F 13/00
[52] U.S. Cl. ................. 395/183.2; 395/185.04
[58] Field of Search ................. 371/15.1, 16.4, 371/16.5, 20.1; 395/575, 185.01, 185.04, 185.08, 183.19, 183.2; 364/231.5, 240.4, 942.04, 267.1, 270.2; 379/164, 9, 133

[56] References Cited

U.S. PATENT DOCUMENTS

| | | | |
|---|---|---|---|
| 4,361,851 | 11/1982 | Asip et al. | 358/84 |
| 4,528,589 | 7/1985 | Block et al. | 358/84 |
| 4,578,700 | 3/1986 | Roberts et al. | 358/84 |
| 4,584,602 | 4/1986 | Nakagawa | 358/84 |
| 4,833,618 | 5/1989 | Verma et al. | 364/483 |
| 4,839,908 | 6/1989 | Takayama | 375/104 |
| 4,937,851 | 6/1990 | Lynch et al. | 379/6 |
| 4,972,453 | 11/1990 | Daniel et al. | 379/10 |

FOREIGN PATENT DOCUMENTS

| | | |
|---|---|---|
| 0317082 | 5/1989 | European Pat. Off. . |
| 8102085 | 7/1981 | WIPO . |
| 9120082 | 12/1991 | WIPO . |

OTHER PUBLICATIONS

Search Report for European Appl. 93308283.6, mailed Apr. 14, 1994.

*Primary Examiner*—Robert W. Beausoliel, Jr.
*Assistant Examiner*—Norman Michael Wright
*Attorney, Agent, or Firm*—Renner, Otto, Boisselle & Sklar, P.L.L.

[57] ABSTRACT

A terminal device management system includes a plurality of terminal devices and a remote management apparatus for remotely managing the plurality of terminal devices. The remote management apparatus includes a data receiving section, a management table storing section for storing a management table including identifiers for the terminal devices which are set to transmit data in a transmission time interval for identifying whether data has been sent from the terminal devices or not, a timer section for measuring a time period during which a line is not connected in the transmission time interval, and a control section for detecting whether or not the time period measured by the timer section reaches a predetermined time period, and for, when it is detected that the predetermined time period is reached, detecting a terminal device the identifier of which in the management table stored in the management table storing section indicates data has not been received therefrom, as a failed terminal device.

4 Claims, 6 Drawing Sheets

| TERMINAL DEVICE IDENTIFICATION NAME | RECEIVING START PREDETERMINED DATE | RECEIVING END PREDETERMINED DATE | RECEIVING FLAG |
|---|---|---|---|
| A | 10/1 8:00 | 10/1 8:10 | OFF |
| B | 10/1 8:00 | 10/1 8:10 | OFF |
| C | 10/1 8:00 | 10/1 8:10 | OFF |
| D | 10/1 8:00 | 10/1 8:10 | OFF |
| E | 10/1 8:00 | 10/1 8:10 | OFF |
| F | 10/1 8:10 | 10/1 8:20 | OFF |

TERMINAL DEVICE MANAGEMENT SYSTEM AND A METHOD FOR DETECTING A FAILED TERMINAL DEVICE USING THE SYSTEM

BACKGROUND OF THE INVENTION

1. Field of the Invention

The present invention relates to a terminal device management system including a plurality of terminal devices and a remote management apparatus, connected to the plurality of terminal devices via lines, for remotely managing the plurality of terminal devices.

2. Description of the Related Art

Conventionally, a terminal device management system including an image forming apparatus such as copying machines located on the user side and a remote management apparatus located on the maker or dealer side and connected to the image forming apparatus via a public telephone line. In such a terminal device management system, the management information such as a paper jam occurring in the copying machine on the user side, the number of copying sheets, and the like are transmitted to the remote management apparatus.

In such a system, it is common that an enormous number of terminal devices are connected to one remote management apparatus. Accordingly, if the individual terminal devices send calls to the remote management apparatus for a line connection at random, the line connection efficiency will be reduced. This is because many calls may be sent in a certain time period, and no call may be sent in another time period. In order to eliminate the above reduction in the line connection efficiency, there exists a system including a remote management apparatus which sets a plurality of prescribed time intervals and a plurality of terminal devices of which one or more terminal devices are allowed to send the calls in each time interval.

In the above manner, the calls sent by the terminal devices are appropriately dispersed, so that the line connection efficiency can be improved. In the case where only one terminal device can send a call in one time interval, the probability that one call-out operation is successful for the line connection is high. In another case where a plurality of terminal devices can send calls in each time interval, all the terminal devices assigned to the time interval conduct their call-out operations at one time. As a result, one of the terminal devices whose call-in is the earliest can succeed in the line connection. The other terminal devices are set into the waiting state until a predetermined time period elapses. Hereinafter, the predetermined time period is referred to as "a redial waiting period", and the waiting state is referred to as "a radial waiting state". When the radial waiting period has elapsed, the remaining terminal devices which have not yet transmitted data conduct their call-out operations at a time.

Such a setting of time intervals in the system will be described by way of an example. In this example, each time interval is set to be 10 minutes, and five terminal devices A, B, C, D, and E are set to transmit data in the time interval from 8:00 on October 1st to 8:10 on the same day. In cases where the management information such as the number of copying sheets, paper jams, and the like is to be transmitted, the data transmission time period for each terminal device is usually about one minute, which is substantially fixed. This is because the management information is constituted by fixed-length data. The radial waiting period can be set to be a common value to the terminal devices. In this example, the radial waiting period is set to be about 20 seconds. If, under the above conditions, the five terminal devices continuously perform the communications, all the communications assigned to the above time interval will finish in about five minutes. However, actually, in case of the time lag between communications or the emergency interrupt communication, the above time interval is set to be relatively longer than the substantial time period required for the usual communications.

On the remote management apparatus side, at the start of each time interval, an unreceived device list for indicating the terminal devices from which data has not been received is first produced. Thereafter, every time when a call from a terminal device is received, the identification number or the like of the terminal device is recognized and the terminal device is deleted from the list. At the end of the time interval, it is determined that data has not been received from the terminal devices which remain in the list, and the determination result is displayed on a display or the like.

In the above system, if any terminal devices remain in the list at the end of the current time interval, the possible reasons are described as follows.

The remote management apparatus can accept an emergency service call or the like occurring in a copying machine from a terminal device which is not included in the terminal devices assigned to the current time interval, as an emergency communication at any required time. Therefore, if the emergency communication takes a long time, the line is not free during the emergency communication. As a result, the current time interval terminates, though the terminal devices assigned to the current time interval repeatedly send calls and cannot be successful in the line connection. In such a case, for the terminal devices which cannot be successful in the line connection, the conventional determination that data has not been received from the terminal devices is correct.

In another case, some terminal devices may remain in the list at the end of the current time interval because the terminal devices have failed and hence did not send calls to the remote management apparatus.

An example of the above case will be described based on the example described as the prior art with reference to the time table shown in FIG. 7.

In FIG. 7, it is assumed that the terminal device E is failed, and thus it cannot conduct its call-out operation to the remote management apparatus. In such a situation, when the present time becomes 8:00 on October 1st, the terminal devices A, B, C, and D send calls at a time. The terminal device A whose call-in is the earliest among them is connected to the remote management apparatus. When the communication for about one minute is finished, the terminal device a is deleted from the list. While the terminal device A comunicates with the remote management apparatus, the terminal devices B, C, and D repeatedly perform the redial operations. Next, the terminal device D whose call-in is the earliest after the communication by the terminal device A is finished is connected to the remote management apparatus. Such a procedure is repeated. When the terminal devices B and C finish their communications with the remote management apparatus, the terminal devices A, B, C, and D are deleted from the list. Only the terminal device E remains in the list. Though the terminal device E is failed and cannot send a call to the remote management apparatus, the current time interval is terminated at 8:10.

The conventional terminal device management system has no means for recognizing the difference between the above two cases. Therefore, both the two cases where some terminal devices remain in the list are treated as the case where data has not been received from the terminal devices.

In order to avoid such an erroneous detection, time intervals set in the remote management apparatus include free time intervals. In the free time interval, the remote management apparatus sends a call to a terminal device from which data has not been received. In this way, it is possible to judge whether each of the terminal devices is failed or not, based on the success or failure in the line connection. However, as described above, when the number of terminal devices which are connected to the remote management apparatus is increased, it is difficult to frequently set the free time intervals. Accordingly, there may occur a case where a call from the remote management apparatus for the judgment is delayed several days. As a result, there exists a problem in that it takes many days for the remote management apparatus to detect the failure of a terminal device.

SUMMARY OF THE INVENTION

The terminal device management system of this invention includes a plurality of terminal devices and a remote management apparatus for remotely managing the plurality of terminal devices, the remote management apparatus being connected to the plurality of terminal devices via a line. Each of the plurality of terminal devices includes: data storing means for storing data to be transmitted; data transmitting means for transmitting the data stored in the data storing means to the remote management apparatus; transmission time interval storing means for storing a transmission time interval; and control means for requesting a line connection to the remote management apparatus in the transmission time interval stored in the transmission time interval storing means, and for, when the line connection is not attained, repeatedly requesting the line connection every predetermined first time period in the transmission time interval. The remote management apparatus includes: data receiving means for receiving data transmitted from the terminal devices; management table storing means for storing a management table including at least identification names of terminal devices which are previously set to transmit data in the transmission time interval and identifiers for the terminal devices having the identification names for identifying whether data has been sent from the terminal devices or not; timer means for measuring a time period during which the line is not connected in the transmission time interval; and control means for detecting whether or not the time period measured by the timer means reaches a second time period which is previously set to be longer than the first time period, and for, when it is detected that the second time period is reached, detecting a terminal device the identifier of which in the management table stored in the management table storing means indicates data has not been received therefrom, as a failed terminal device.

In one embodiment of the system of the invention, the first time period and the second time period for each of the plurality of terminal devices are different from those for the other ones.

According to another aspect of the invention, a method for detecting a failed terminal device in a terminal device management system including a plurality of terminal devices and a remote management apparatus for remotely managing the plurality of terminal devices, the remote management apparatus being connected to the plurality of terminal devices via a line is provided. The method includes the steps of: requesting a line connection from each of the terminal devices to the remote management apparatus in a transmission time interval; repeatedly requesting the line connection every predetermined first time period in the transmission time interval, when the line connection is not attained; storing a management table in the remote management apparatus, the management table including at least identification names of terminal devices which are previously set to transmit data in the transmission time interval and identifiers for the terminal devices having the identification names for identifying whether data has been sent from the terminal devices or not; measuring a time period during which the line is not connected in the transmission time interval; and detecting whether or not the measured time period reaches a second time period which is previously set to be longer than the first time period, and, when it is detected that the second time period is reached, detecting a terminal device the identifier of which in the management table indicates data has not been received therefrom, as a failed terminal device.

In one embodiment the method of the invention, the first time period and the second time period for each of the plurality of terminal devices are different from those for the other ones.

Thus, the invention described herein makes possible the advantage of providing a terminal device management system in which the failure of a terminal device can be detected as early as possible by the remote management apparatus.

This and other advantages of the present invention will become apparent to those skilled in the art upon reading and understanding the following detailed description with reference to the accompanying figures.

DESCRIPTION OF THE PREFERRED EMBODIMENTS

Figure 1:
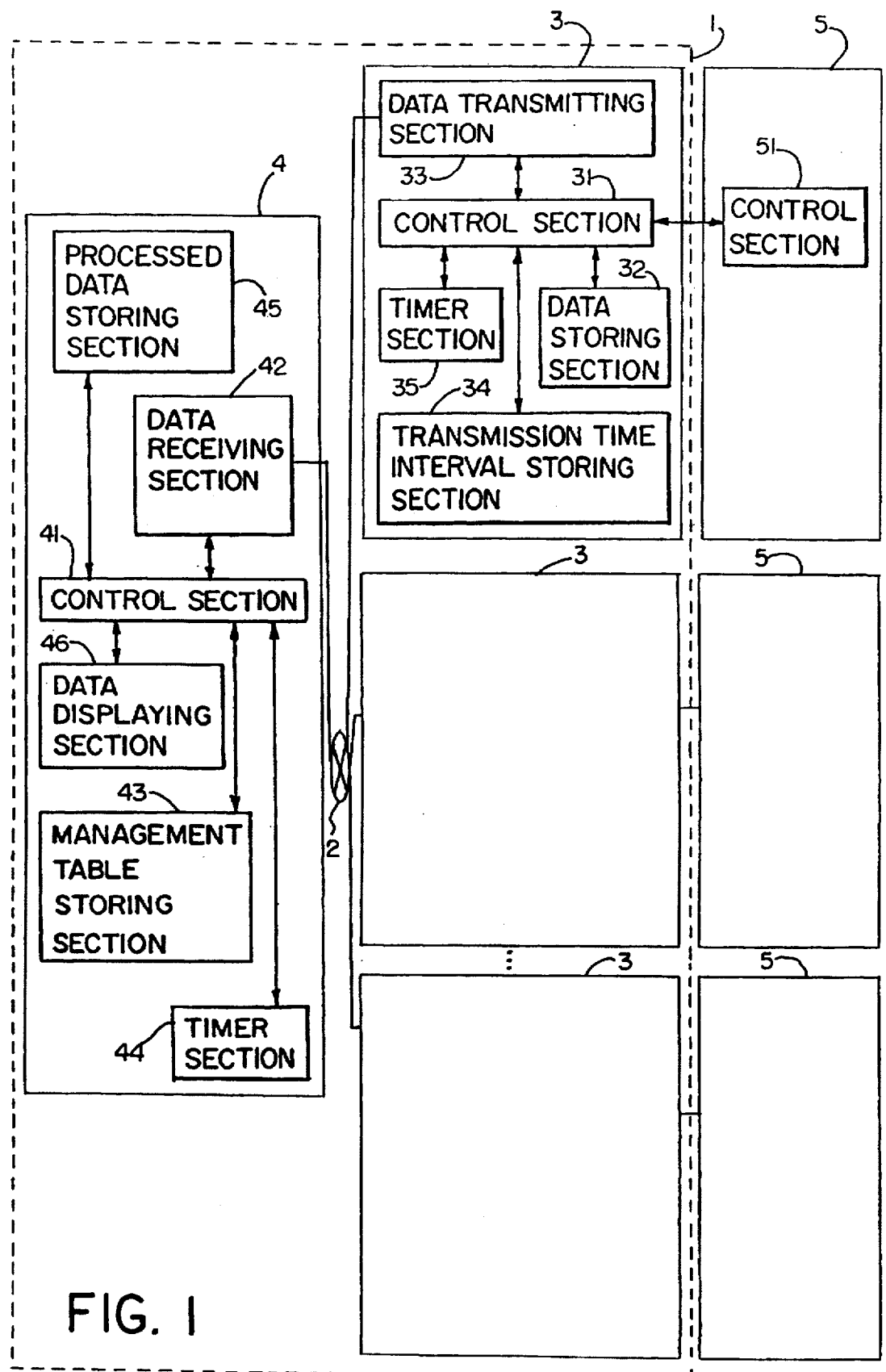
FIG. 1 is a functional block diagram showing the construction of a terminal device management system of an example according to the invention.

FIG. 1 shows a construction of a terminal device management system 1 of an example according to the invention. The terminal device management system 1 includes a plurality of terminal devices 3 connected to a line 2 such as a public telephone line, and a remote management apparatus 4, connected to the line 2, for remotely managing the plurality of terminal devices 3. To each of the terminal devices 3, a separate copying machine 5 or the like is connected via a communication line.

Each terminal device 3 includes a control section 31 for usually performing a communication with control section 51 in the copying machine 5 and for performing various processes such as data communication processes. To the control section 31, data storing section 32, data transmitting section 33, transmission time interval storing section 34, and timer section 35 are connected. The data storing section 32 stores various kinds of data obtained by the communication with the copying machine 5. The data transmitting section 33 transmits the data in the data storing section 32 to the remote management apparatus 4. The transmission time interval storing section 34 stores the time interval in which the data transmitting section 33 should transmit the data. The timer section 35 measures the redial waiting period in the case where, when the data transmitting section 33 sends a call to the remote management apparatus 4 for the data transmission, the remote management apparatus 4 is being connected to another terminal device 3, so that the line connection cannot be attained. Each of the data storing section 32 and the transmission time interval storing section 34 may be realized by, for example, a random access memory (RAM). The control section 31 may be realized by, for example, a central processing unit (CPU). The data transmitting section 33 may be constructed by, for example, a network control unit (NCU), a modem, or the like.

The remote management apparatus 4 includes a control section 41 for performing various processes such as a data receiving process and a processing of the received data. To the control section 41, data receiving section 42, management table storing section 43, timer section 44, processed data storing section 45, and data displaying section 46 are connected. The data receiving section 42 receives data from each terminal device 3. The management table storing section 43 divides the time period allowing the data to be received into a plurality of time intervals, and stores the identification numbers or the like of the terminal devices which can transmit data in each time interval. The timer section 44 measures the time period for which the line is free in each time interval. The processed data storing section 45 stores the processed data based on the data received by the data receiving section 42. The data displaying section 46 is capable of displaying the contents of the processed data storing section 45 at any desired time. Each of the management table storing sections 43 and the processed data storing section 45 may be realized by, for example, a RAM. The control section 41 may be realized by, for example, a CPU. The data receiving section 42 may be constructed by, for example, an NCU, a modem, or the like.

Figures 2, 4:
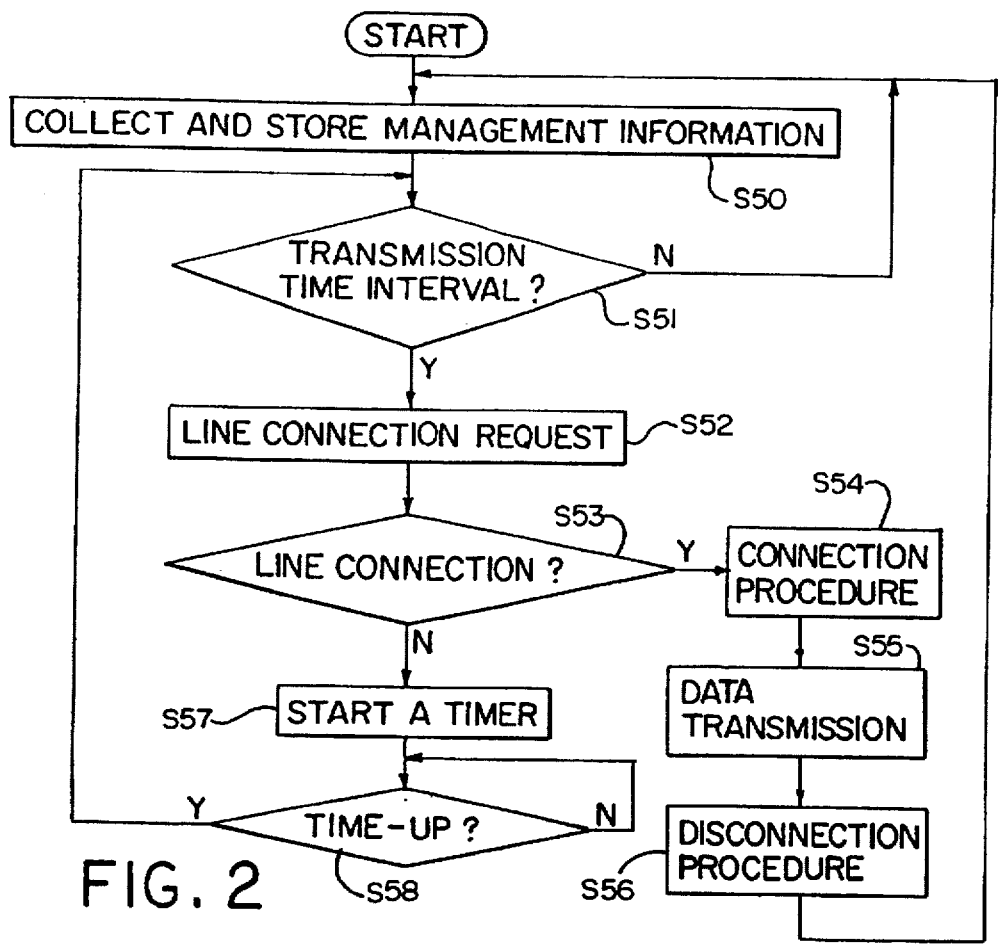
FIG. 2 is a flowchart illustrating the procedure of the data transmission process performed by the control section of the remote management apparatus in the example according to the invention.
FIG. 4 is a diagram showing an exemplary management table stored in the management table storing section in the example according to the invention.

Referring to FIG. 2, the schematic operation of the terminal device 3 with the above construction will be described. The copying machine 5 performs the image forming operation under the control of the control section 51. The control section 51 of the copying machine 5 always communicates with the control section 31 of the terminal device 3 via the communication line. The control section 31 collects management information one by one such as the accumulated number of copying sheets, the number of copying sheets per day used by the copying machine 5, the sizes of the used copying sheets, and the conditions and positions of paper jams occurring in the copying machine 5. The management information is in turn stored in the data storing section 32 (Step S50). The transmission time interval storing section 34 stores the time interval in which the terminal device 3 should transmit the management information stored in the data storing section 32 to the remote management apparatus 4. When the control section 31 detects that the current time reaches the time interval stored in the transmission time interval storing section 34 by using the timer function included in the control section 31 (Step S51), the data transmitting section 33 sends a line connection request to the data receiving section 42 in the remote management apparatus 4 (Step S52). Then, it is judged whether the line is connected or not (Step S53). If the line is connected, a predetermined connection procedure is performed (Step S54), and then the management information stored in the data storing section 32 are transmitted to the remote management apparatus 4 (Step S55). When the transmission is finished, a predetermined disconnection procedure is performed (Step S56), and then the line is disconnected. Thereafter, such management information is collected again.

The line may be busy (No in Step S53) because the remote management apparatus 4 is communicating with another terminal device 3 which can transmit data in the same time interval as that for the above terminal device 3, or because the remote management apparatus 4 is receiving an emergency communication from one terminal device 3 which is not assigned to the time interval. In such a case, the call from the terminal device 3 is not received. This is detected and the timer section 35 is started (Step S57). After the timer section 35 finishes to measure the redial waiting period (Yes in Step S58), it is judged again whether the present time is within the stored time interval in Step S50. If the present time is within the time interval, Step S52 and the foregoing steps are performed again.

If it is judged in Step S51 that the present time is beyond the stored time interval, the line connection request is not sent regardless of whether the data transmission is attained or not. If the timing at which the line connection is detected in Step S53 is almost the end of the time interval, there may occur the case where the time interval is terminated in the middle of the data transmission. In such a case, the line disconnection will not be performed until the data transmission is finished.

Figure 3:
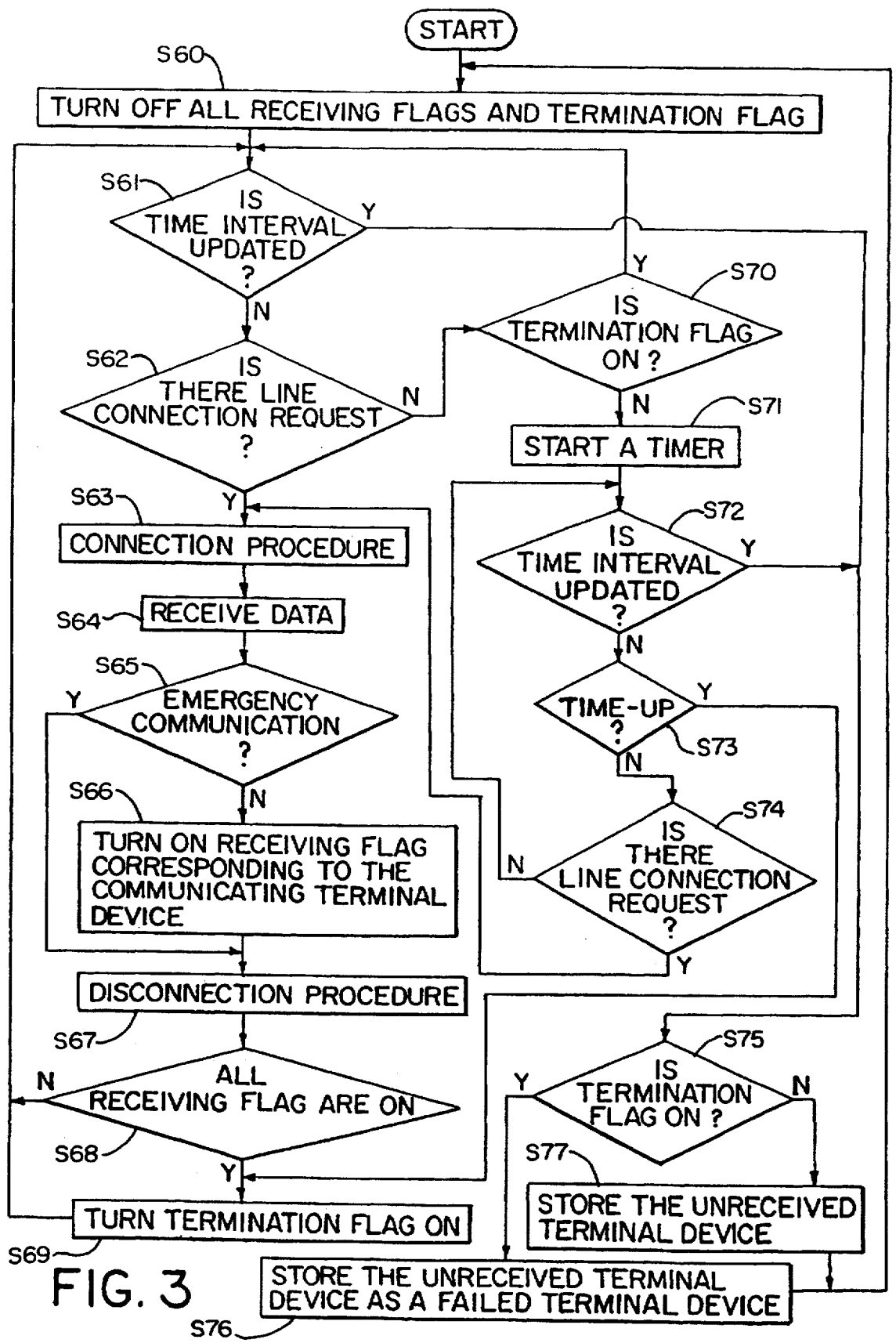
FIG. 3 is a flowchart illustrating the procedure of the data receiving process performed by the control section of the remote management apparatus in the example according to the invention.

Next, referring to FIG. 3, the schematic operation of the remote management apparatus 4 will be described. For explanation, the present time is assumed to be 8:00 on October 1st. The operation is explained from this time. As shown in FIG. 4, five terminal devices A, B, C, D, and E are set to transmit data in the time interval from 8:00 to 8:10 on October 1st.

At the time when the present time reaches 8:00 on October 1st, in Step S61 or S72, it is detected that the present time is shifted from the currently interested time interval to the next time interval. Then, by detecting a status of a termination flag (Step S75), a process of Step S76 or Step S77 is performed. Thereafter, the process returns to Step S60.

When the process returns to Step S60, the remote management apparatus 4 turns OFF all the receiving flags provided for the respective terminal devices and a termination flag in the management storing section 43 (Step S60). In the management table storing section 43, as is shown in FIG. 4, an identification name for identifying each terminal device, a predetermined date and time of the start of receiving from each terminal device and a predetermined date and time of the end of receiving therefrom as a receiving time interval for the terminal device, and a receiving flag which indicates whether a call is received from each terminal device or not. The receiving flag is turned ON if the call from the terminal device 3 is received within the predetermined time interval, and the receiving flag remains OFF if the call from the terminal device 3 is not received in the time interval.

Next, it is judged whether the current time interval is updated or not (Step S61). In this example, the current time is immediately after 8:00, and the time interval has been updated a little while ago, so that the judged result is No, and the process proceeds to Step S62.

In Step S62, it is judged whether any of terminal devices 3 send their calls or not, i.e., it is judged whether there are any line connection requests or not, via the data receiving section 42. In the time interval from 8:00 on October 1st to 8:10 on October 1st, it is predetermined that five terminal devices A, B, C, D, and E send their calls. Accordingly, the five terminal devices simultaneously send their calls at 8:00. Therefore, the judged result at Step S62 is Yes, and the process proceeds to Step S63. Actually, there is some time lag from the time at which the respective terminal devices send their calls to the time at which the remote management apparatus 4 receives the calls, so that in many cases, the process proceeds to Step S63 via Steps S70 to S74.

When there is a line connection request, the data receiving section 42 performs a prescribed connection procedure (Step S63), and then the data from the terminal device 3 is received (Step S64). The control section 41 processes the received data and stores the processed data in the processed data storing section 45.

Next, it is judged whether the current communication is a data transmission from the terminal devices 3 assigned to this time interval or an emergency transmission from the terminal device 3 which is not assigned to the time interval (Step S65). If the communication is not an emergency transmission, but a normal data transmission from the terminal device 3 assigned to this time interval (No at Step S65), the identification number or the like of the terminal device 3 with which the remote management apparatus 4 communicates is recognized, whereby the corresponding receiving flag in the management table storing section 43 is turned ON (Step S66). If it is judged to be the emergency transmission, the line disconnection procedure is performed (Step S67).

Next, it in judged whether all the receiving flags are turned ON or not (Step S68). In the early stage of the time interval, only some of the terminal devices complete their transmissions. Accordingly, the judged result at Step S68 is No, and the process returns to Step S61. If all the receiving flags are turned ON, it means that the five terminal devices A, B, C, D, and E which are set to transmit data in this time interval complete their data transmissions. When all the five terminal devices finish their data transmissions (Yes at Step S68), the termination flag is turned ON (Step S69), and the process returns to Step S61.

When the process returns from Step S69 to Step S61 (that is, when the normal data transmissions in the current time interval are completed), it is judged whether the current time interval is updated or not. If the current time interval is not updated, it is judged at Step S62 whether there are any line connection requests from the terminal devices 3 or not. If there is a line connection request, Stop S63 and the foregoing steps are performed. It is understood from the fact that the normal data transmissions are completed that the line connection request is an emergency transmission from the terminal device 3 which is not included in the terminal devices 3 assigned to the time interval. If it is judged at Step S62 that there is no line connection request, it is judged at Step S70 whether the termination flag is ON or not. If the termination flag is ON, the process returns to Step S61. If it is Judged at Step S61 that the current time interval is updated, the process proceeds to Step S75, and the succeeding process is performed.

Specifically, in the case where all the terminal devices which are set to transmit data in the current time interval properly complete their transmissions, and the process returns from Step S69 to Step S61, if there is any line connection request, a normal connection procedure (Step S63) and data is transmitted (steps after Step S64). This case occurs after the termination flag is turned ON, so that the data transmission is an emergency transmission. In another case where the process returns from Step S69 to Step S61, if there is no line connection request (No in Step S62), the process proceeds to Stop S70.

In the case where it is judged at Step S68 that all the receiving flags are not turned ON (No at Step S68), and the process returns to Step S61, if the time interval is not updated (No at Step S61), the process proceeds to Step S62.

In one of the following two cases, it is judged at Step S62 that there is a line connection request. (1) There is a line connection request from the terminal device 3 which is assigned to this time interval, but the receiving flag of which has not been turned ON. (2) There is a line connection request for an emergency transmission from the terminal device 3 which is not included in the terminal devices which are assigned to this time interval. In either of the two cases, the line is connected and the transmission is attained.

In the following two cases, it is judged at Step S62 that there is no line connection request. (3) The remaining terminal devices assigned to the time interval are in the radial waiting state. (4) The remaining terminal devices cannot send the line connection requests because of a failure thereof or the like.

Figure 5:
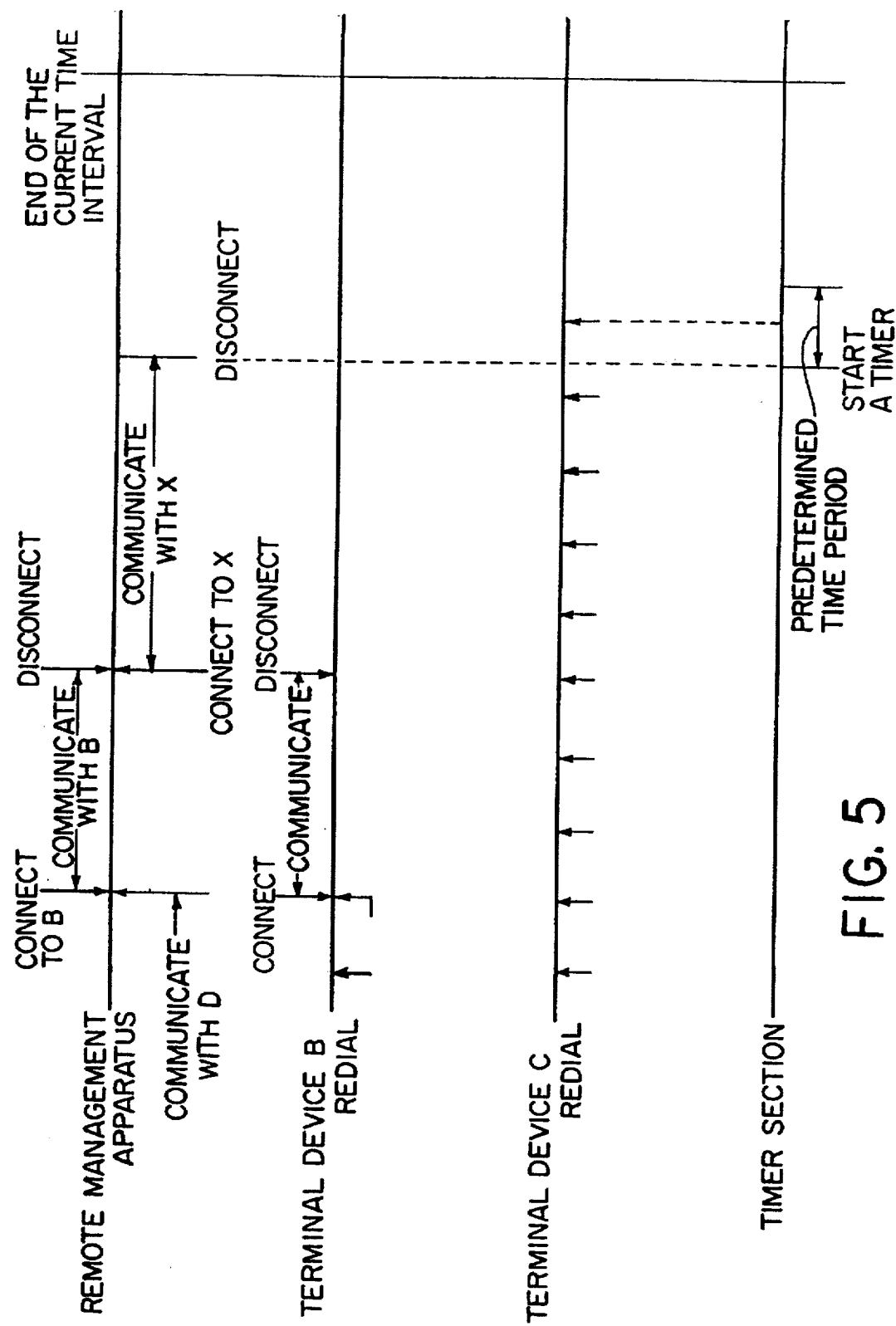
FIG. 5 is a time chart showing an exemplary schematic process performed by the terminal device management system according to the invention.

One example of the case (3) is shown in FIG. 5. At the time when among the five terminal devices A, B, C, D, and E which should transmit data in the current time interval, the terminal devices A, E, D, and B complete their transmissions, an emergency transmission from a terminal device X is sent. While the emergency transmission from the terminal device X is performed, the terminal device C which has not yet transmitted data repeats the radial operation. When the communication with the terminal device X is finished, the line is disconnected. During the above procedure, Steps S68, S61, and S62 shown in the flowchart of FIG. 3 are performed. As is shown in FIG. 5, at the time when the line is disconnected from the terminal device X, the terminal device C is in the redial waiting state. Accordingly, it is not judged at Step S62 that there is a line connection request, and the process proceeds to Step S70. Thereafter, it is judged that the termination flag is not turned ON (No at Step S70) because the process for the terminal device C is not finished, and the process proceeds to Step S71 where the timer section 44 is started. In other words, the timer section 44 starts its operation after it is judged that there is no line connection request (which is equivalent to the state where "the line is free").

The time period measured by the timer section 44 is compared with the time period which is previously set so as to be somewhat longer than the radial waiting period in Step S73. For example, it is assumed that the redial waiting period is 20 seconds, the predetermined time period can be set to be about 30 seconds. The radial waiting period can be variously set for each terminal device which should transmit data in the current time interval, and alternatively can be commonly set. In the case where the redial waiting time periods are variously met for the respective terminal devices which should transmit data in the current time interval, the predetermined time periods can also be variously set depending on the various redial waiting periods.

After the timer section 44 is started at Step S71, it is judged whether the time interval is updated or not (Step S72). If the current time interval is not updated, it is judged whether the time period measured by the timer section 44 reaches the predetermined time period or not (Step S73). If it is judged that the time period measured by the timer section 44 does not reach the predetermined time period, it is judged whether there is any line connection request or not (Step S74). If it is judged that there is no line connection request, the process returns to Step S72. The above process loops until any one of the conditions that the time interval is updated (Yes at Step S72), that the time period measured by the timer section 44 reaches the predetermined time period (Yes at Step S73), or that there is a line connection request (Yes at Step S74) is satisfied. As is understood from the above, Step S72 is provided for exiting from the loop in the case where the time interval is updated before the time period measured by the timer section 44 reaches the predetermined time period.

In the example shown in FIG. 5, the terminal device C sends a line connection request by the redial operation before the time period measured by the timer section 44 reaches the predetermined time period. Accordingly, the process proceeds from Step S74 to Step S63, and the data transmission is performed.

Figure 6:
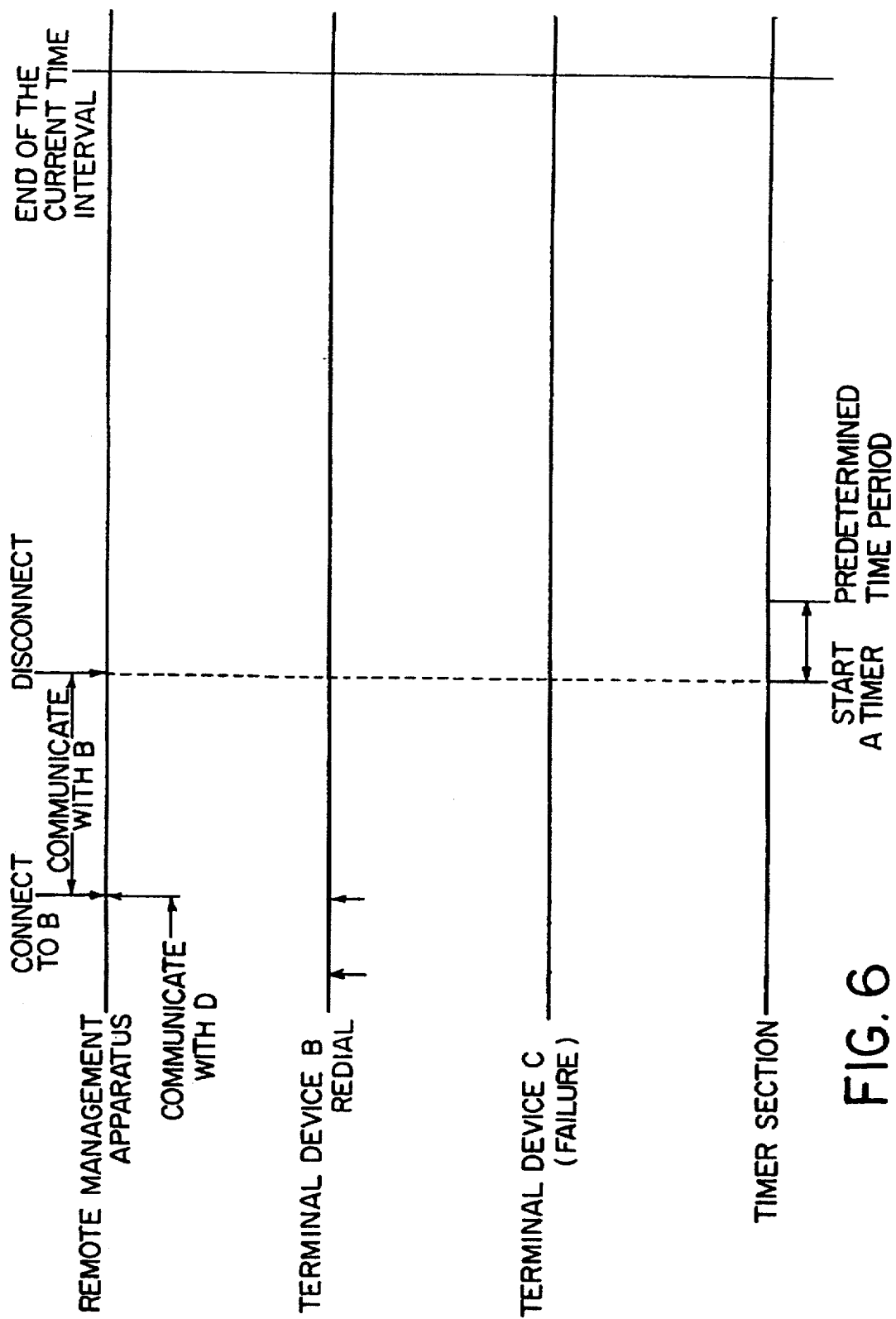
FIG. 6 is a time chart showing another exemplary schematic process performed by the terminal device management system according to the invention.
Figure 7:
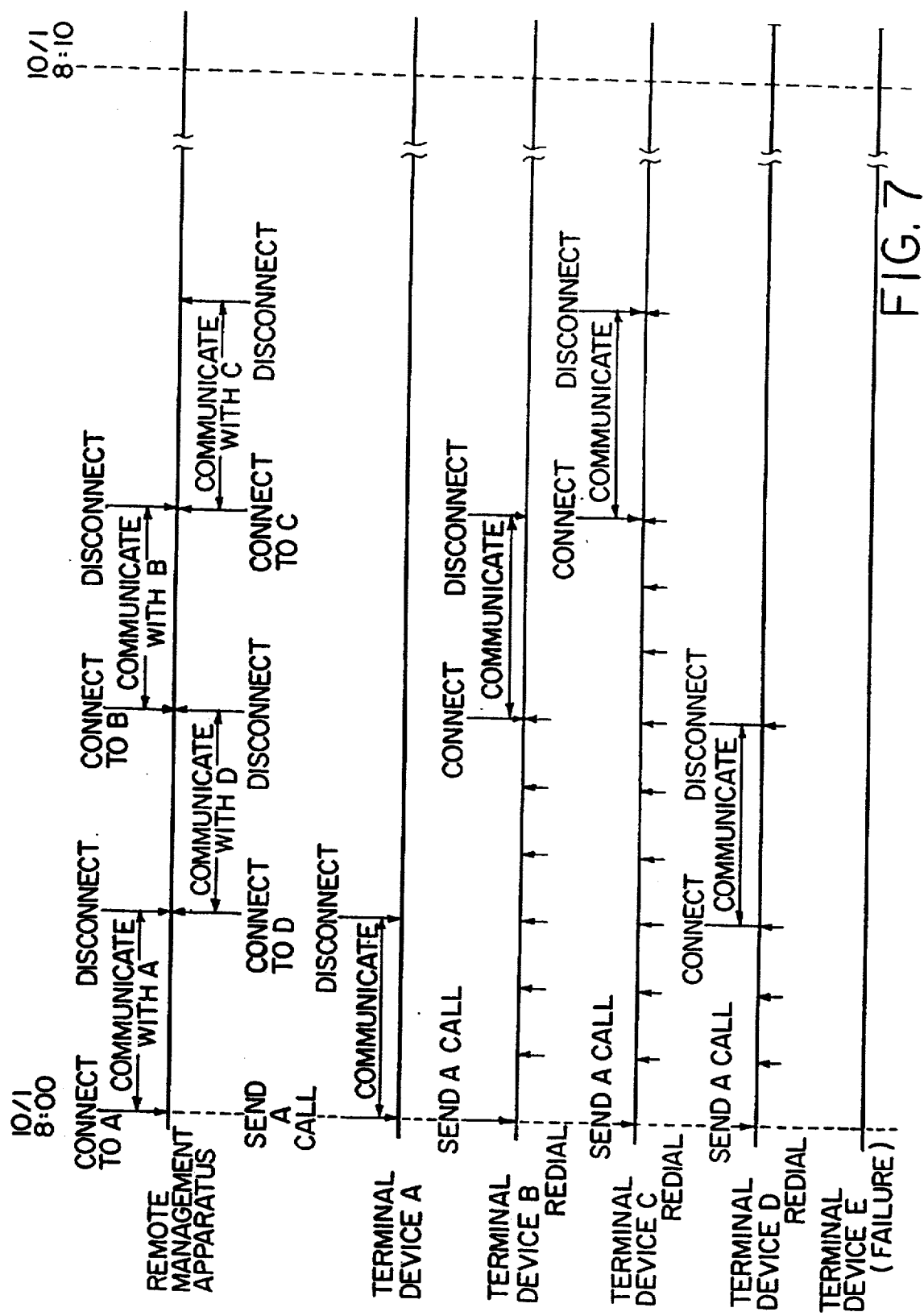
FIG. 7 is a time chart showing a schematic process performed by a conventional terminal device management system.

One example of the case (4) is shown in FIG. 6. In this example, the terminal device C is assumed to be under the condition that it cannot send a call to the remote management apparatus 4 because of its failure. As in the example of FIG. 5, the communications with the terminal devices A, E, and D, and then the terminal device B are terminated. Thereafter, it is detected at Step S62 that there is no line connection request, and the timer section 44 is started at Step S71 via Step S70. The terminal device C does not send a call to the remote management apparatus 4 because of the failure thereof. Therefore, it is judged at Step S74 that there is no line connection request, and the process enters the loop for measuring the time period by the timer section 44. When the time period measured by the timer section 44 reaches the predetermined time period (Yes at Step S73), the process proceeds to Step S69. After the termination flag is turned ON, the process returns to Step S61.

The control section 41 monitors whether a call is sent from the terminal device C from the time at which the line becomes free to the end of the predetermined time period. As described above, the predetermined time period is set to be somewhat longer than the radial waiting period. As a result, in the case where the terminal device C is not failed, the terminal device C sends a call to the remote management apparatus 4 by the redial operation in the predetermined time period. Therefore, the judged result at Step S74 is Yes, and the process proceeds to Stop S63 and the foregoing steps (as in the example shown in FIG. 5). However, in the case where the terminal device C is failed, a call by the radial operation does not occur within the predetermined time period. Therefore, at the time when the line is free, the control section 41 starts the timer section 44 and judges whether or not there is any call sent from a terminal device from which the remote management apparatus 4 has not yet received a call until the time period measured by the timer section 44 reaches the predetermined time period. The control section 41 determines whether the terminal device from which the remote management apparatus 4 has not yet received a call is failed or not based on the judged result. If there is no call from a terminal device from which the remote management apparatus 4 has not yet received a call until the time period measured by the timer section 44 reaches the predetermined time period, it is determined that the terminal device is failed.

In this way, the terminal device C is determined to be a failure, so that even if the terminal device C remains in the unreceived device list, no more calls are sent to the remote management apparatus 4 from the terminal devices A, B, D and E as well as C which should transmit data in the current time interval. Accordingly, the termination flag is turned ON (Step S69). Thereafter, in the ON state of the termination flag, by the loop of Steps S61, S62 and S70, the remote management apparatus 4 is set in a waiting state for an emergency transmission from any terminal device which is not assigned to the current time interval.

If the emergency transmission from the terminal device X takes a very long time, there may be a case where the current time interval is updated immediately after the communication with the terminal device X or during the communication with the terminal device X, while the remote management apparatus 4 has not yet received calls from the terminal devices which are set to transmit data in the current time interval. In the former case where the current time interval is updated immediately after the communication with the terminal device X, it is judged to be Yes at Step S72 during the measuring operation of the timer section 44. In the latter case where the current time interval is updated during the communication with the terminal device X, it is judged to be Yes at Step S61.

Thereafter, it is chocked whether the termination flag is ON or not at Stop S75. If the termination flag is ON, there may be two possible cases. In one case, all the terminal devices which are set to transmit data in the current time interval complete the communications (all the receiving flags are ON in the management table storing section 43). In the other case, one or more terminal devices have failed and they cannot communicate with the remote management apparatus 4 (only the receiving flags corresponding to the failed terminal devices are OFF in the management table storing section 43). Therefore, in Step S76, if there is some terminal devices the receiving flags of which remain OFF in the management table storing section 43, the terminal devices are stored as the failed terminal devices. Thereafter, an alarm or the like is generated on the side of the remote management apparatus 4, so that the failure of a terminal device can be found earlier.

If the termination flag is OFF in Step S75, it is judged that the remaining terminal devices cannot transmit data because the line is busy for the emergency transmission or the like in the current time interval. In this case, the terminal devices the receiving flags of which remain OFF in the management table storing section 43 are stored as the unreceived terminal devices, in Step S77. However, in this case, when the line is free in another time interval which is set in the remote management apparatus 4, the remote management apparatus 4 may send a call to the stored terminal device, and data is collected therefrom.

In the above examples, the time interval is set to be 10 minutes, but the time interval may be set to be any desired value.

In addition, the number of terminal devices which are set to transmit data in one time interval can be desirably determined based on the relationship between the length of the data transmission time of each terminal device and the length of the time interval.

In addition, a failed terminal device is identified at the time when the time interval is updated (i.e., when it is judged to be Yes at Step S61 or S72). Alternatively, a failed terminal device may be identified at the time when the time period measured by the timer section 44 reaches the predetermined time period (i.e., when it is judged to be Yes at Step S73). If an alarm or the like may be generated at this time, the failure of the terminal device can be found much earlier.

As described above, the line connected to the remote management apparatus is monitored as to whether the line is free or busy in the current time interval. If the remote management apparatus does not receive a call from a terminal device from the time when the line is free to the time when a predetermined time has elapsed, the terminal device is determined to have failed. Therefore, any failed terminal device can be found and the countermeasure against the failure can be performed in an earlier stage.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A terminal device management system including a plurality of terminal devices and a remote management apparatus for remotely managing said plurality of terminal devices, said remote management apparatus being connected to said plurality of terminal devices via a line, each of said plurality of terminal devices comprising:

data storing means for storing data to be transmitted;

data transmitting means for transmitting said data stored in said data storing means to said remote management apparatus;

transmission time interval storing means for storing a transmission time interval; and terminal device control means for requesting a line connection to said remote management apparatus in said transmission time interval stored in said transmission time interval storing means, and for, when said line connection is not attained, repeatedly requesting said line connection every predetermined first time period in said transmission time interval, said predetermined first time period being shorter than said transmission time interval, said remote management apparatus comprising:

data receiving means for receiving data transmitted from said terminal devices;

management table storing means for storing a management table including at least identification names of terminal devices which are previously set to transmit data in said transmission time interval and corresponding identifiers for said terminal devices having said identification names for identifying whether data has been sent from said terminal devices or not;

timer means for measuring a time period during which said line is not connected in said transmission time interval; and remote management apparatus control means for detecting whether or not the time period measured by said timer means reaches a predetermined second time period set to be longer than said first time period, and for, when it is detected that said predetermined second time period is reached by said measured time period, identifying a respective terminal device as a failed terminal device in the event said corresponding identifier in said management table stored in said management table storing means indicates data has not been received from said respective terminal device.

2. A terminal device management system according to claim 1, wherein said first predetermined time period and said second predetermined time period for each of said plurality of terminal devices are different from those for the other ones.

3. A method for detecting a failed terminal device in a terminal device management system including a plurality of terminal devices and a remote management apparatus for remotely managing said plurality of terminal devices, said remote management apparatus being connected to said plurality of terminal devices via a line, said method comprising the steps of:

requesting a line connection from each of said terminal devices to said remote management apparatus in a transmission time interval;

repeatedly requesting said line connection every predetermined first time period In said transmission time interval, when said line connection is not attained;

storing a management table in said remote management apparatus, said management table including at least identification names of terminal devices which are previously set to transmit data in said transmission time interval and identifiers for said terminal devices having said identification names for identifying whether data has been sent from said terminal devices or not;

measuring a time period during which said line is not connected in said transmission time interval; and detecting whether or not said measured time period reaches a second time period which is previously set to be longer than said first time period, and, when it is detected that said second time period is reached, detecting a terminal device said identifier of which in said management table indicates data has not been received therefrom, as a failed terminal device.

4. A method according to claim 3, wherein said first time period and said second time period for each of said plurality of terminal devices are different from those for the other ones.

* * * * *